United States Patent [19]
Harpaz et al.

[11] Patent Number: 5,346,335
[45] Date of Patent: Sep. 13, 1994

[54] METAL CUTTING TOOL

[75] Inventors: Jacob Harpaz, Kfar Vradim; Raphael Wertheim, Kiryat Bialik; Benjamin Betman, Kiryat Chaim, all of Israel

[73] Assignee: Iscar Ltd., Migdal Tefen, Israel

[21] Appl. No.: 73,965

[22] Filed: Jun. 7, 1993

Related U.S. Application Data

[63] Continuation of Ser. No. 861,560, Apr. 1, 1992, abandoned.

[30] Foreign Application Priority Data

Apr. 2, 1991 [IL] Israel ......................................... 97746

[51] Int. Cl.⁵ ............................................. B23B 27/10
[52] U.S. Cl. .......................................... 407/11; 82/52; 407/117; 408/57
[58] Field of Search ............... 82/50, 52; 407/11, 117; 408/57, 59, 60

[56] References Cited

U.S. PATENT DOCUMENTS

| | | |
|---|---|---|
| 4,558,974 | 12/1985 | Pano ...................................... 407/117 |
| 4,621,955 | 11/1986 | Briese ................................... 408/59 X |
| 4,992,008 | 2/1991 | Pano ...................................... 407/114 |
| 5,148,728 | 9/1992 | Mazurkiewicz ................... 408/57 X |

FOREIGN PATENT DOCUMENTS

| | | | |
|---|---|---|---|
| 3004166 | 8/1980 | Fed. Rep. of Germany ........ 407/11 |
| 3429842 | 2/1986 | Fed. Rep. of Germany . |
| 3740814 | 6/1989 | Fed. Rep. of Germany ........ 407/11 |
| 127904 | 7/1985 | Japan .................................... 407/11 |
| 4183503 | 6/1992 | Japan .................................... 408/57 |
| 1342690 | 10/1987 | U.S.S.R. ............................... 407/11 |

Primary Examiner—Steven C. Bishop
Attorney, Agent, or Firm—Burgess, Ryan and Wayne

[57] ABSTRACT

A metal cutting tool having a metal cutting tip such as a replaceable insert, having top and bottom faces and a plurality of peripheral faces and a rake face forming part of the top face. A cutting edge is formed at the intersection of the top face and one of the peripheral faces. Chip forming means is formed on the top face and comprises, in lateral sectional view, successive portions of which at least one is relatively recessed with respect to a preceding or succeeding portion. A through-going bore is formed in the insert and extends from one of the bottom and peripheral faces to the relatively recessed portion in a direction towards the cutting edge.

19 Claims, 4 Drawing Sheets

METAL CUTTING TOOL

This application is a continuation of application Ser. No. 861,560, filed Apr. 1, 1992, now abandoned.

FIELD OF THE INVENTION

This invention relates to a metal cutting tool of the kind having a metal cutting tip which is either an integral part of the tool or which is a metal cutting insert which is releasably retained in an insert holder for use in parting, grooving, turning or milling operations.

BACKGROUND OF THE INVENTION

With such metal cutting tools, the tip cutting edge becomes rapidly worn and must be frequently reset or, where the tip is a replaceable insert, the latter must therefore be frequently replaced. The degree of wear of the cutting edge is directly related to the degree of heating of the cutting edge during the cutting operation, and it is therefore known to provide means for cooling the cutting tip during the cutting operation. Such known means involve spraying the cutting tip or the cutting insert and/or the insert holder with a suitable cooling liquid and/or arranging for the generated heat to be thermally dissipated. (See, e.g. DE 3004166 and DE 3429842.)

Another well-known problem in the use of metal cutting tools for metal cutting operations of the kind indicated above resides in the effective and safe removal of the metal cutting chips formed during the cutting operation. Various means are employed so as to ensure the effective and safe removal of these chips, such means generally involving the provision of the metal cutting tip with suitable chip forming means which ensure that the chips are effectively compacted and break away in relatively short lengths. Furthermore, when the cutting tool is used in cut-off or grooving operations, it must be ensured that the chip does not become lodged within the cut-off slot and so the chip forming means are usually so designed as to ensure that the chip is narrowed in its lateral extent, thereby preventing the chip from becoming lodged in the slot.

BRIEF SUMMARY OF THE INVENTION

It is an object of the present invention to provide a new and improved metal cutting tool as well as a replaceable metal cutting insert for use with such a metal cutting tool so as to facilitate the use of the flow of a cooling fluid, on the one hand to limit wear of the cutting edge, and on the other hand to ensure effective removal of metal cutting chips.

According to one aspect of the present invention there is provided a metal cutting tool having a metal cutting tip having top and bottom faces and a plurality of peripheral faces and a rake face forming part of the top face; a cutting edge formed at the intersection of the top face and one of the peripheral faces; chip forming means formed on said top face and comprising, in lateral sectional view, successive portions of which at least one is relatively recessed with respect to a preceding or succeeding portion and a through-going bore formed in said insert and extending from one of said bottom and peripheral faces to said relatively recessed portion in a direction towards said cutting edge.

According to another aspect of the present invention there is provided a metal cutting tool comprising a metal cutting insert, and an insert holder for releasably retaining said insert, said insert having top and bottom faces and a plurality of peripheral faces and a rake face forming part of the top face; a cutting edge formed at the intersection of the top face and one of the peripheral faces; chip forming means formed on said top face and comprising, in lateral sectional view, successive portions of which at least one is relatively recessed with respect to a preceding or succeeding portion and a through-going bore formed in said insert and extending from one of said bottom and peripheral faces to said relatively recessed portion in a direction towards said cutting edge, said insert holder being formed with a through-going bore, one end of which is adapted to be coupled to a cooling fluid supply source and the opposite end of which communicates with said insert bore.

The invention also relates to metal cutting inserts for use with such a metal cutting tool.

With a metal cutting tool in accordance with the invention, the cooling stream directed through the insert bore strikes the chip in the region thereof close to the cutting edge where the chip is still hot and relatively malleable. By directing the chip away from the insert, the effective length of contact of chip and the insert is reduced, thereby reducing heat which arises from the frictional contact of the chip with the insert. Furthermore, the effect of the cooling jet on the chip is, on the one hand, to influence and fix any deformation and narrowing of the chip caused by the chip forming means and also to render the chip more brittle and therefore readier to break and, on the other hand, to deflect the chip away from the insert and the workpiece. Thus, the cooling stream tends to assist in the effective removal of the compacted and readily broken chip lengths from the insert and the workpiece. At the same time, the cooling fluid serves to effect cooling of the insert, particularly in the region of the cutting edge thereof, and in this way effectively reduces the wear on the cutting edge.

It will be realised that by virtue of the cooling of the chip and the insert, metallurgical phase changes occur in the chip and the workpiece.

The particular construction of the cutting insert and the fact that the outlet of the insert bore is located in a relatively recessed portion of the chip forming means ensures that the chip, during its formation, does not effectively block the bore outlet but that there is rather formed a recess between the insert and the chip, which recess becomes filled with the cooling fluid, thereby contributing to the chip evacuation and to the cooling effect of the fluid.

BRIEF SUMMARY OF THE DRAWINGS

For a better understanding of the present invention, and to show how the same may be carried out in practice, reference will now be made to the accompanying drawings in which.

DETAILED DESCRIPTION OF PREFERRED EMBODIMENTS

Figure 1:
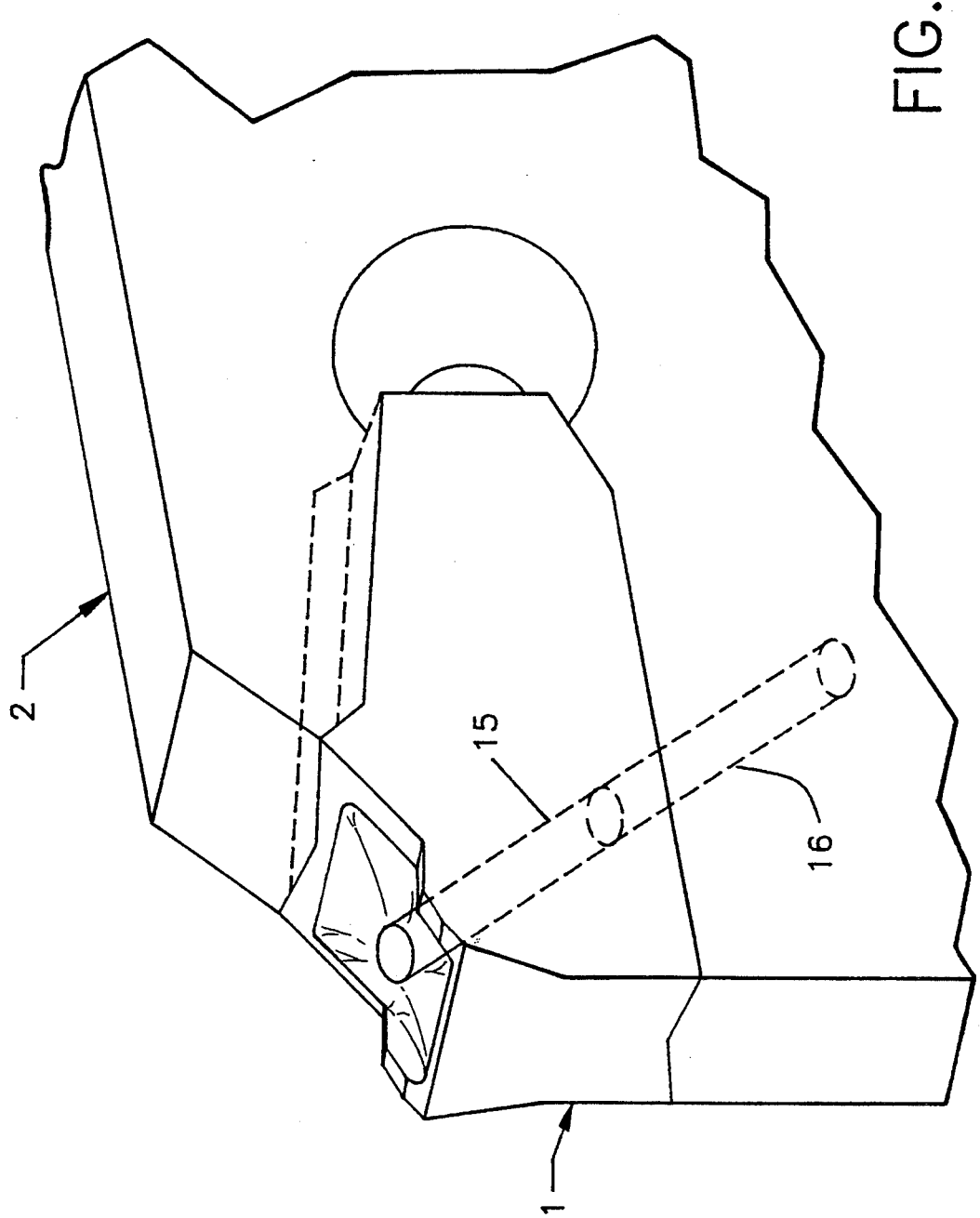
FIG. 1 is a perspective view of a portion of a metal cutting tool in accordance with the present invention.
Figure 2:
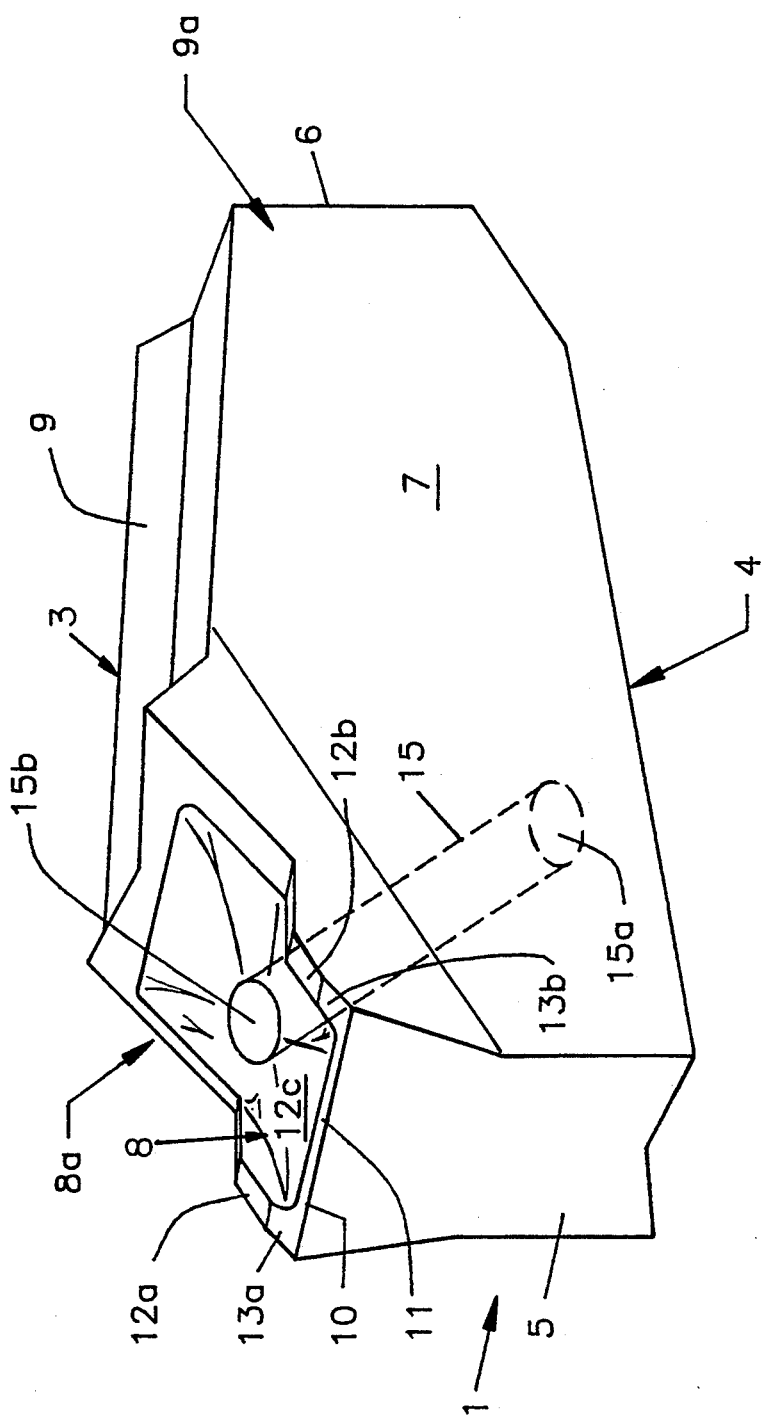
FIG. 2 is a perspective view of the metal cutting insert used in the metal cutting tool shown in FIG. 1.

As seen in FIGS. 1 and 2 of the drawings, a metal cutting tool comprises a metal cutting insert 1 and an insert holder 2. Both the insert and the insert holder are, for example, of the kind disclosed in our U.S. Pat. No. 4,558,974 to which reference can be made for further particulars. As seen in FIG. 2, the insert 1 comprises an upper face 3 and a bottom face 4, a front peripheral (relief) face 5, a rear peripheral face 6 and side peripheral faces 7. The top face 3 consists of a leading rake surface 8 of a leading insert portion and a trailing keying surface 9 of a trailing wedge-shaped portion 9a, the surface 9 sloping towards the bottom face 4 which is also formed with a keying structure.

A cutting edge 10 is formed at the intersection of the front relief face 5 and the leading rake surface 8 and is provided with a substantially planar land surface 11.

The rake surface 8 is provided with chip forming means 8a comprising a pair of elevated side ridges 12a and 12b which present rearwardly sloping chip deflecting surfaces 13a and 13b. Intermediate the ridges 12a and 12b is a relatively recessed central portion 12c. Thus the chip forming means 8a comprises, in lateral sectional view, successive portions 12a, 12c and 12b with the portion 12c being recessed with respect to the portions 12a and 12b.

Extending through the insert 1 is a through-going bore 15 which extends, in a direction towards the cutting edge 10, from a bore inlet 15a located in the bottom face 4 to a bore outlet 15b located in the recessed portion 12c of the rake face 8.

As can be seen from FIG. 1, when the insert 1 is retainably wedge clamped in a corresponding wedge-shaped slot formed in an insert holder 2, the insert bore 15 communicates with a corresponding bore 16 formed in the insert holder 2 and the bore 16 communicates with a source of cooling fluid (not shown).

The mode of use and functioning of the cutting tool just described with reference to FIGS. 1 and 2 of the drawings will now be considered with reference to FIGS. 3, 4 and 5 of the drawings.

Figure 3:
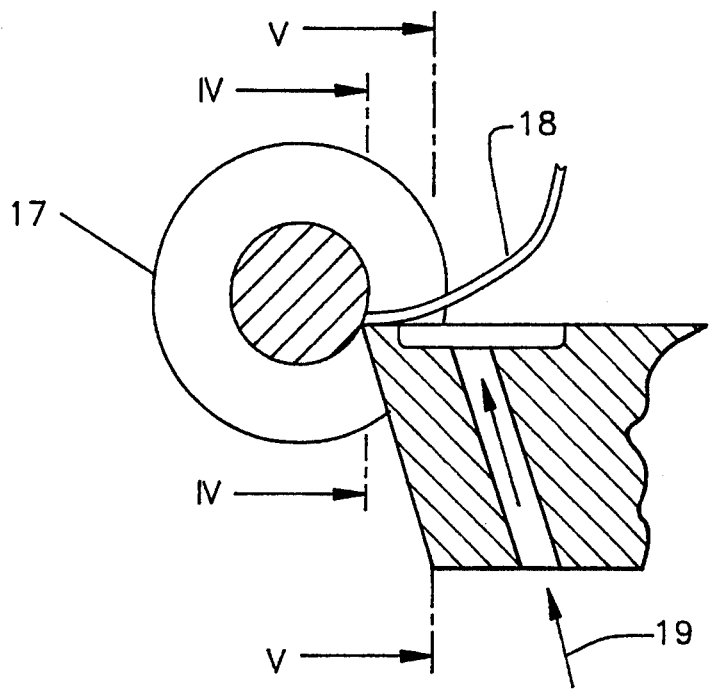
FIG. 3 is a schematic, cross-sectioned side elevation of an insert and workpiece, shown during a parting operation.

As seen in FIG. 3, when the metal cutting tool in accordance with the invention is used in a parting operation on a workpiece 17, the metal cutting chip 18, immediately after shearing is diverted upwardly by passing over the planar land surface 11 and the chip deflecting surfaces 13a and 13b. At the same time, a stream of cooling fluid 19 passes through the insert bore 15, effectively fills and expands within the cavity formed by the recessed portion 12c and strikes the undersurface of the central portion of the chip 18.

The action of the cooling fluid stream is essentially two-fold. On the one hand, it effectively cools the insert, especially in the region of the cutting edge thereof, thereby reducing the wear of the cutting edge and thus prolonging its effective working life. On the other hand, the stream contributes to the effective upward deflection of the chip 18 away from the cutting tool and the workpiece 17. Furthermore, the cooling fluid stream 19, by striking the central underportion of the chip 18, results in the differential cooling of this central underportion with respect to the upper portion of the chip 18 and this combines with the chip forming means to deform the chip 18.

Figure 4:
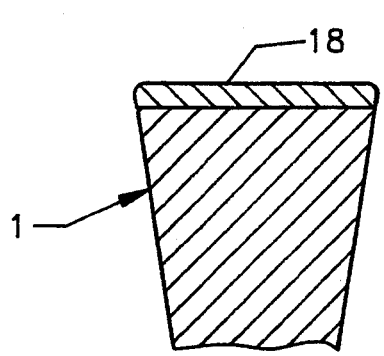
FIGS. 4 and 5 are respectively cross-sectional views of the insert and chip as shown in FIG. 3 along the lines IV—IV and V—V.
Figure 5:
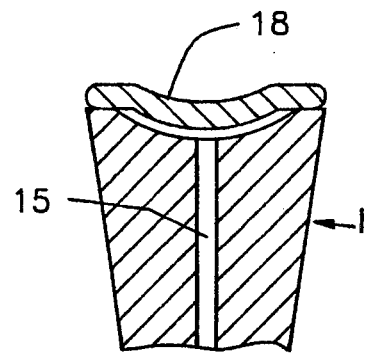

Thus, as can be seen in FIG. 4 of the drawings, the chip 18 immediately after shearing extends uniformly and flatly over the land surface 11 of the insert 1. However, when the chip has progressed over the recessed portion 12c it is struck by the cooling fluid stream 19. The combined effect of the chip former means 8a and the cooling stream results in the chip 18 being deformed downwardly as is clearly shown in FIG. 5 of the drawings. The thus deformed chip 18 narrows beyond the lateral dimension thereof in the initial stage as shown in FIG. 4 of the drawings. This narrowed, deformed chip 18 readily clears the slot formed in the workpiece in a parting-off operation. The cooling of the chip leads to its ready curling with a substantially increased curling radius and it readily coils into a compact shape and breaks off in compact masses. The breaking off of the chip 18 is facilitated by the differential cooling thereof by the jet, which renders the chip 18 much more brittle.

Figure 6:
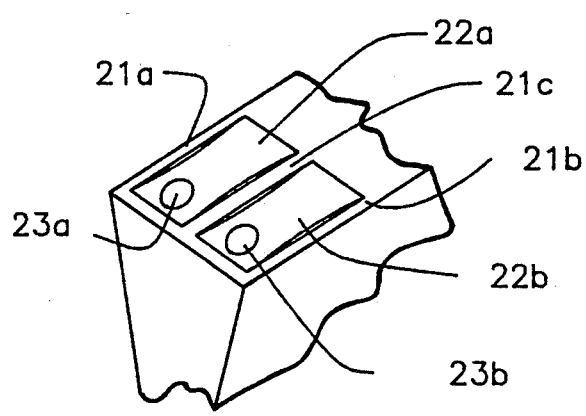

In the embodiment schematically shown in FIG. 6 of the drawings, the rake face of the insert is provided, in addition to side ridges 21a, 21b, also with a central ridge 21c, the side ridges 21a, 21b defining with the central ridge 21c a pair of recessed portions 22a, 22b, each recessed portion 22a, 22b including the outlet 23a, 23b of a separate insert bore.

Figure 7:
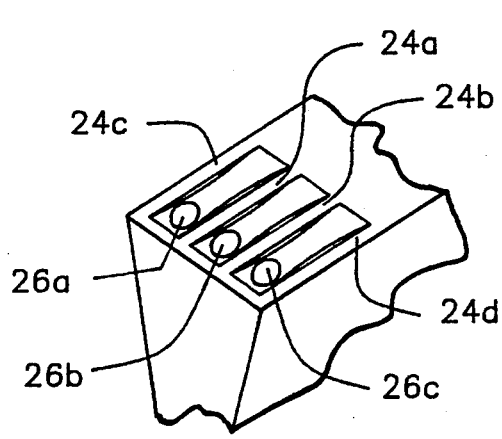
FIGS. 6 and 7 are respective perspective views of portions of modified inserts in accordance with the present invention.

In the embodiment shown in FIG. 7 of the drawings, the rake face of the insert is provided with a pair of central ridges 24a, 24b which, together with the side ridges 24c, 24d, define three successive recessed portions 25a, 25b, 25c, each including an outlet 26a, 26b, 26c of a distinct insert bore.

In all cases, however, the outlet of the or each insert bore is formed in a recessed portion of the rake face and in this way it is ensured that the chip cannot effectively seal the outlet of the insert bore so as to prevent the effective discharge of the cooling fluid. On the contrary, the cooling fluid spreads throughout the recess and therefore effective cooling and lubrication is achieved.

Whilst in the embodiments described and illustrated above the insert bore and the outlets thereof are of circular cross-sectional shape, other cross-sectional shapes for the bore can effectively be used, a suitable cross-sectional shape being an effectively elliptical shape.

The transverse extent of the bore outlet (or where a plurality of bore outlets are involved, the sum of the bore outlets) should be within the range of 5–50% (preferably 10–40%) of the overall lateral extent of the insert.

The lateral dimensions of the base must be sufficiently low to ensure that the cooling stream strikes the chip with sufficiently high pressure but not so low as to reduce the flow rate to below that required for effective insert cooling and chip deformation.

The cooling stream enters each bore at a pressure which can be between atmospheric pressure and 20 atm. A preferred pressure range is 6–16 atm.

Whilst, as indicated above, the insert bore or bores should be directed towards the cutting edge, the angle of direction of the insert bore or bores with respect to the plane of the rake face can lie between 5°–85° with respect to a plane which passes through the cutting edge and the rotational axis of the workpiece. Preferably the angle lies between 60°–80° and, as is the case in the embodiment shown in the drawings, the bore extends from the bottomface of the insert. The possibility, however, also exists for the bore to extend from a rear peripheral face of the insert.

The or each recessed portion of the rake face can be constituted effectively by a flared outlet or mouth of the or each bore.

Figure 8:
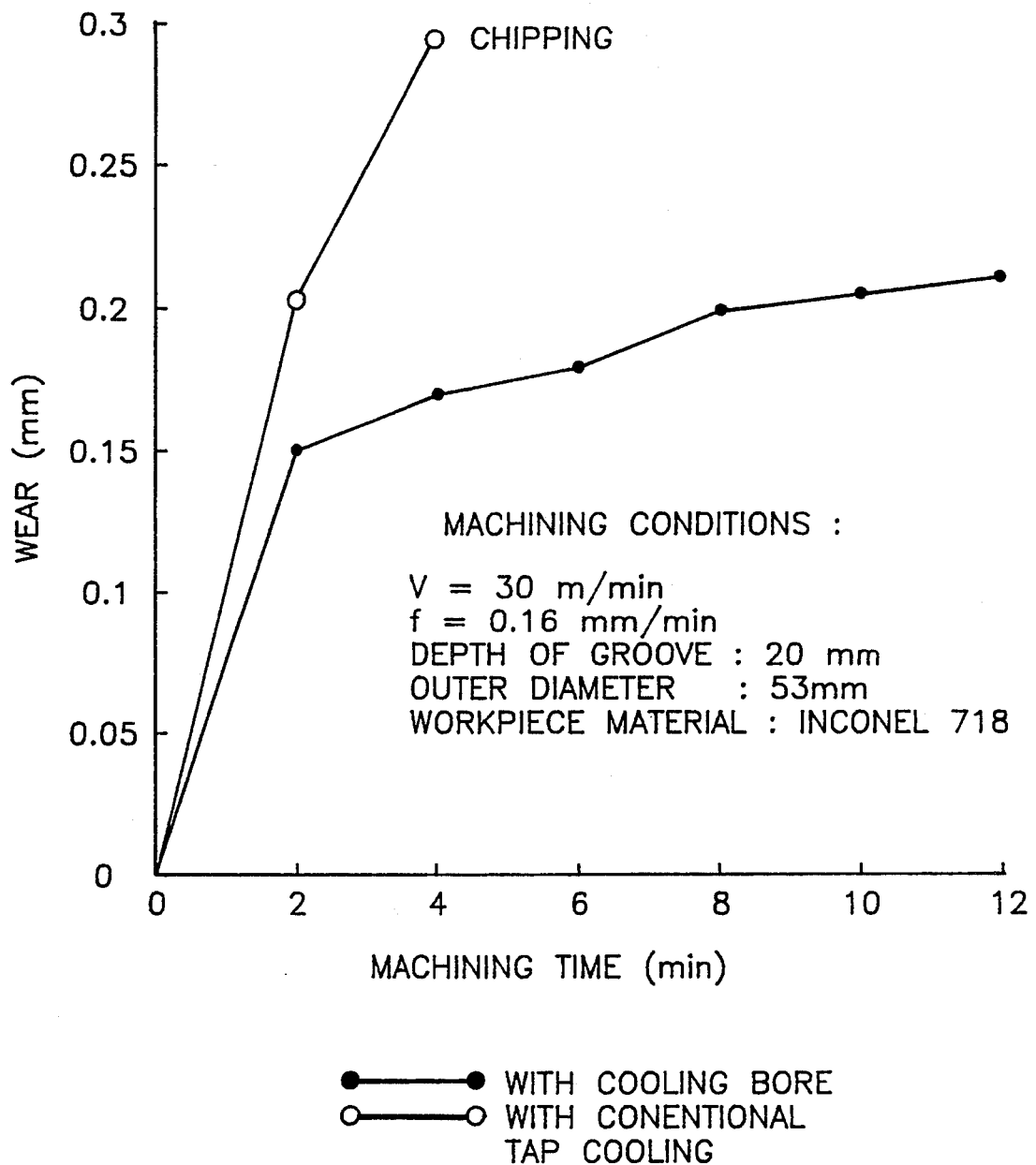
FIG. 8 is a graph showing a comparison of the relative wear of a conventional insert and one in accordance with the invention.

FIG. 8 is a graph showing the relative wear of a GFN-3 IC20 insert when used in forming a groove in an INCONEL 718 steel bar. The figure shows the differing wear behaviour of the same type of insert used under the same conditions, on the one hand when the cutting tool is subjected to conventional cooling from an overhead cooling liquid source directed on to the rake face and, on the other hand when the cutting tool is subjected to cooling in accordance with the present invention with a fluid flow pressure of 16 atm. As can be readily seen from the figure, the wear experienced when the insert is cooled in accordance with the present invention is very significantly less than that when the insert is subjected to cooling under standard cooling conditions and, in consequence, the effective working lifetime of inserts in accordance with the present invention is very significantly greater than that of conventionally cooled inserts.

Whilst the invention has been specifically described as applied to a parting or cut-off tool or the kind wherein the insert is wedge clamped in a correspondingly wedge-shaped slot formed in an insert holder, the invention is equally applicable to other forms of cutting tools wherein the cutting insert is releasably retained in the insert holder by other means and where the tool is designed also for other types of cutting operations, such as turning or milling.

Thus, for example, and as described in our U.S. Pat. No. 4,992,008, the insert can be formed, in addition to a front cutting edge for use in parting or grooving, also with side cutting edges, for use in laterally directed turning operations. Such an insert can be provided, in accordance with the present invention, with a plurality of through-going bores so that one or more recessed portions respectively associated with the cutting edges are respectively formed with one or more bores.

Whilst the invention has been specifically described by way of example in connection with a metal cutting tool wherein the cutting tool is constituted by a cutting tip which consists of a replaceable insert, the invention is equally applicable where the cutting tip forms an integral part of, e.g. is brazed to, the cutting tool.

We claim:

1. A metal cutting tool comprising:
    a metal insert including
        upper and bottom faces,
        laterally directed front and rear faces,
        a pair of longitudinally directed side faces,
        a laterally directed front cutting edge defined at a junction of said upper and front faces,
        a rake surface formed in said upper face adjacent said front cutting edge,
        chip forming means formed in said rake surface and having adjoining relatively raised and recessed portions, and
        bore means for cooling said insert and for deflecting a chip cut by said cutting edge away from said insert, said bore means including at least one through-going bore formed in said insert, each bore extending in a direction towards said cutting edge from a bore inlet formed in said bottom surface to a bore outlet formed in one said recessed portion so as to be superposed by the chip cut by said cutting edge and passing over said rake surface, said bore outlet being spaced from the cut chip by reason of said raised portions on which the cut chip rides;
    insert holder means for releasably retaining said insert, said insert holder means being formed with a cooling fluid duct having one end adapted to be coupled to a cooling fluid supply source and an opposite end coupled to said bore inlet when said insert is retained in said insert holder means; and a cooling fluid supply source in fluid communication with the cooling fluid duct to supply cooling fluid to the fore means at a pressure of from 1 to 20 atmospheres.

2. A metal cutting tool according to claim 1, wherein said insert is formed with a wedge-shaped body portion releasably wedge clamped within a correspondingly wedge shaped slot formed in the insert holder means.

3. A metal cutting tool according to claim 1, wherein each said through-going bore defines an angle with respect to a plane which passes through the cutting edge and a rotational axis of a workpiece, said angle lying between 5°–85°.

4. A metal cutting tool according to claim 3, wherein said angle lies between 60°–80°.

5. A metal cutting tool according to claim 1, wherein said chip forming means comprises at least two chip forming ridges defining between them at least one said recessed portion.

6. A metal cutting tool according to claim 5, wherein successive pairs of chip forming ridges define between them successive recessed portions.

7. A metal cutting tool according to claim 6, wherein a plurality of said through-going bores are formed, having bore outlets respectively located in said successive recessed portions.

8. A metal cutting tool according to claim 1, wherein longitudinally directed side cutting edges are respectively defined at junctions of said upper and side faces for use in laterally directed cutting operations, each side cutting edge being associated with a recessed portion and with the outlets of at least one through-going bore.

9. A metal cutting tool of claim 1 wherein the cooling fluid supply source supplies cooling fluid at a pressure of from 6 to 16 atmospheres.

10. A metal cutting insert for use in a metal cutting tool, said insert comprising:
    upper and bottom faces,
    laterally directed front and rear faces,
    a pair of longitudinally directed side faces,
    a laterally directed front cutting edge defined at a junction of said upper and front faces,
    a rake surface formed in said upper face adjacent said front cutting edge,
    chip forming means forming in said rake surface and including adjoining relatively raised and recessed portions, and
    bore means for cooling said insert and for deflecting a chip cut by said cutting edge away from said insert, said bore means including at least one through-going bore formed in said insert, each said bore extending in a direction towards said cutting edge from a bore inlet formed in said bottom surface to a bore outlet formed in one said recessed portion so as to be superposed by the chip cut by said cutting edge and passing over said rake surface, said bore outlet being spaced from the cut chip by reason of said raised portions on which the cut chip rides, each said bore adapted to be coupled to a cooling fluid duct in an insert holder which releasably retains said insert; and a cooling supply means in fluid communication with the cooling fluid duct to supply cooling fluid to the bore means at a pressure of from 1 to 20 atmospheres.

11. A metal cutting insert according to claim 10, wherein said chip forming means comprises at least one elongated, longitudinally directed ridge having a leading chip deflecting surface, with one said recessed portion adjoining said ridge.

12. A metal cutting insert according to claim 11, wherein a plurality of said ridges are provided with each said recessed portion being located between successive ridges.

13. A metal cutting insert according to claim 12, wherein a plurality of recessed portions are respectively located between successive ridges and wherein a like plurality of through-going bores are provided which respectively extend from said bottom face to said recessed portions.

14. A metal cutting insert according to preceding claim 10, wherein the total lateral dimensions of the outlets of said bores constitute between 5–50% of the overall length of the cutting edge.

15. A metal cutting insert according to claim 14, wherein said total lateral dimension constitutes between 10–40% of said overall length.

16. A metal cutting insert according to claim 10 and formed with a wedge-shaped body portion adapted to be wedge clamped within a correspondingly wedge-shaped slot formed in the insert holder.

17. A metal cutting insert according to claim 10, wherein longitudinally directed side cutting edges are relatively defined at junctions of said upper and side faces for use in laterally directed cutting operations, each side cutting edge being associated with a recessed portion and with the outlet of at least through-going bore.

18. A metal cutting tool comprising:
a metal insert including:
upper and bottom faces,
laterally directed front and rear faces,
a pair of longitudinally directed side faces,
a laterally directed front cutting edge defined at a junction of said upper and front faces,
a rake surface formed in said upper face adjacent said front cutting edge,
chip forming means formed in said rake surface and having adjoining relatively raised and recessed portions, and
bore means for cooling said insert and for deflecting a chip cut by said cutting edge away from said insert, said bore means including at least one through-going bore formed in said insert, each said bore extending in a direction towards said cutting edge from a bore inlet formed in said bottom surface to a bore outlet formed in one said recessed portion so as to be superposed by the chip cut by said cutting edge and passing over said rake surface,
insert holder means for releasably retaining said insert, said insert holder means being formed with a cooling fluid duct having one end adapted to be coupled to a cooling fluid supply source and an opposite end coupled to said bore inlet when said insert is retained in said insert holder means,
a cooling and fluid source in communication with the cooling fluid duct to provide cooling fluid at a pressure of from 1 to 20 atmospheres to the bore means in the insert.

19. A metal cutting insert for use in a metal cutting tool, said insert comprising:
upper and bottom faces,
laterally directed front and rear faces,
a pair of longitudinally directed side faces,
a laterally directed front cutting edge defined at a junction of said upper and front faces,
a rake surface formed in said face adjacent said front cutting edge,
chip forming means formed in said rake surface and including adjoining relatively raised and recessed portions, and
bore means for cooling said insert and for deflecting a chip cut by said cutting edge away from said insert, said bore means including at least one through-going bore formed in said insert, each said bore extending in a direction towards said cutting edge from a bore inlet formed in said bottom surface to a bore outlet formed in one said recessed portion so as to be superposed by the chip cut by said cutting edge and passing over said rake surface, each said bore adapted to be coupled to a cooling fluid duct in an insert holder which releasably retains said insert and
a cooling fluid supply means in fluid communication with the cooling fluid duct to supply cooling fluid to the bore means at a pressure of from 1 to 20 atmospheres.

* * * * *